3,652,609
2-PARACHLOROPHENOXY-2-METHYLPROPIONIC ACID-FATTY ACID GLYCERIDES

Harvey E. Alburn, West Chester, William Dvonch, Radnor, and Norman H. Grant, Wynnewood, Pa., assignors to American Home Products Corporation, New York, N.Y.
No Drawing. Filed June 24, 1969, Ser. No. 836,162
Int. Cl. A61k 27/00; C07c 69/30, 69/76
U.S. Cl. 260—408           6 Claims

ABSTRACT OF THE DISCLOSURE

Fatty acid glycerides of 2-phenoxy-2-methylpropionic acids are prepared which are useful in lowering blood cholesterol and triglyceride levels in warm-blooded animals.

---

This invention relates to glycerol esters and more particularly to fatty acid glycerides of phenoxy-2-methylpropionic acids.

The compounds of the invention may be illustrated by the following formula:

In the above formula, $R^1$, $R^2$, and $R^3$ are intended to represent either hydrogen, a 2-phenoxy-2-methylpropionyl radical in which the benzene ring is unsubstituted or may be substituted by a lower alkyl, lower alkoxy, halogen or trifluormethyl radical or a naturally occuring fatty acid residue of the formula $CH_3(CH_2)_nCO-$ in which $n$ is a number from 0 to 18. It is also intended that at least one of $R^1$, $R^2$, and $R^3$ is a fatty acid residue as identified above and at least one of $R^1$, $R^2$, and $R^3$ is a 2-phenoxy-2-methylpropionyl radical and no more than one of these symbols is hydrogen. The terms "lower alkyl" or "lower alkoxy" as used here are meant to cover substituents of 1 to 2 carbon atoms.

Compounds of the invention have been found useful as hypolipemic agents since scientifically accepted pharmacological tests show they are effective in lowering blood level cholesterol in hypercholesterolemic test animals and also in lowering blood triglycerides at a dosage well below toxic levels and in the range of 5 to 50 mg. per day. An antilipemic test may be described in general terms as follows:

Male weanling rats are fed a hypercholesterolemic diet for three weeks. Serum cholesterol is determined on 0.01 ml. of serum separated from tail blood collected in a capillary tube. Groups of rats with equal average serum cholesterol are given the test compound orally once a day by syringe for 3 days. Serum cholesterol is determined in the morning of the fourth day. Antilipemic activity is demonstrated by a lowering of the serum cholesterol. Potency is expressed as the percent activity of a concomitantly run standard steroid.

In use, the active compound may be administered with or without additives, such as other active substances to enhance the desired lowering effects, or inert, diluent carriers may be combined with the active element.

In general, the compounds of the invention are prepared by reacting a selected acid chloride with the proper glyceride ester at room temperature using a mildly basic solvent such as pyridine.

A second procedure is to react a selected acid with glycerol using an acid catalyst such as p-toluene sulfonic acid in an alcoholic solvent. Thereafter, further acylation may be carried out with a desired acid halide.

A third procedure involves acylation of 1,3-benzylideneglycerol with a selected acid halide, removing the blocking group by hydrogenation and then acylating the product by another selected acid halide. As indicated, these reactions take place at about room temperature.

For greater detail, the following examples are illustrative of the procedures described above to make representative compounds of the invention.

EXAMPLE 1

Glycerol, 2-palmitate, 1,3-di[2-(p-chlorophenoxy)-2-methylpropionate]

1,3-benzylideneglycerol (8.59 g., 0.0476 mole) was acylated with 15.73 g. (0.057 mole) of palmitoyl chloride in the presence of an equivalent amount of pyridine in chloroform solution. After 24 hours at 25°, the reaction mixture was diluted with 2.5 vol. ethyl ether and washed with an equal volume of ice-cold 0.4% HCl, followed by washing with water until neutral. After recrystallization from ethanol, 20 g. of the product was dissolved in 150 ml. of ethanol in a pressure bottle. The bottle was purged with nitrogen and 0.9 g. palladium black was added. Hydrogenation was carried out for 1 hour at 30 lb. The filtered solution was concentrated to yield 10 g. of 2-palmitoyl glycerol.

A mixture of 9.15 g. of this product (2.76 mmoles) plus 4.89 g. of the acid chloride of p-chlorophenoxyisobutyric acid (21 mmoles) was dissolved in 100 ml. of chloroform with 10 ml. of pyridine. The system was stirred for 2 days, after which the solution was diluted with 2.5 volumes of ether, washed with an equal volume of 0.4% HCl, and washed with water until neutral. The organic layer was concentrated in vacuo with replacement of chloroform by ethanol, and the residue was recrystallized from ethanol-acetone.

EXAMPLE 2

Glycerol, 1-[2-(p-chlorophenoxy)-2-methylpropionate]-3-palmitate

A mixture of p-chlorophenoxy-2-methylpropionic acid (10 g.) and p-toluene sulfonic acid (2 g.) was refluxed in 400 ml. of isopropanol-glycerol (1:1) for 8 hours. The isopropanol was removed under vacuum, and there was then added 600 ml. of saturated $NaHCO_3$ and 600 ml. of ethyl ether. After mixing, the ether layer was removed and the aqueous layer was extracted a second time with fresh ether. The pooled ether layers were washed with water, dried with sodium sulfate, treated with charcoal, and concentrated to an oil weighing 8.8 g. 4.57 g. (0.020 mole) of the product was dissolved in 100 ml. of chloroform with 2.5 ml. pyridine. 6.6 g. palmitoyl chloride (0.024 mole) was added slowly with cooling in an ice-bath. The reaction was allowed to proceed for 3 days, after which the solution was diluted with 2.5 volumes of ether, washed with an equal volume of ice-cold 0.4% HCl, and washed with water until neutral. The organic layer was concentrated in vacuo with replacement of chloroform by ethyl alcohol. The residue was crystallized twice from ethyl alcohol-acetone.

In the same way as described in Example 2, glycerol, 1-[2-(p-chlorophenoxy) - 2 - methylpropionate], 2,3-dipalmitate may be prepared by replacing the 6.6 g. palmitoyl chloride with 16.5 g. (0.060 mole), and carry through the reaction and isolation as described. Also, carrying out the procedure of Example 2, but substituting 19.8 (0.060 mole) of eicosanoyl chloride for palmitoyl chloride, one produces the corresponding acylated compound, glycerol, 1-[2-(p - chlorophenoxy)-2-methylpropionate], 2,3-di-eicosanoate.

EXAMPLE 3

Glycerol, 2-[2-(p-chlorophenoxy)-2-methyl-propionate]-1,3-dipalmitate 4.57 g. 2-[2-(p-chlorophenoxy) - 2 - methylpropionyl] glycerol (0.020 mole) was dissolved in 100 ml. chloroform with 7.0 ml. pyridine (0.060 mole). 16.5 g. palmitoyl chloride (0.060 mole) was added slowly with cooling in an ice-bath. The reaction was let run 3 days; after which time the solution was diluted with 2.5 volume ether, washed with an equal volume of ice-cold 0.4% hydrochloric acid, and washed with water until neutral. The organic layer was concentrated in vacuo with replacement of chloroform by ethyl alcohol. The residue was crystallized twice from ethyl alcohol:acetone (95:1 v./v.) to give an 8% yield of product; M.P. 41–44°. Spectrum:

$\lambda_{max}^{KBr}$ 5.78 micron (ester band)

*Analysis.*—Calcd. for $C_{45}H_{27}ClO_7$ (percent): C, 70.70; H, 10.15. Found (percent): C, 70.74; H, 10.01.

The compound, glycerol, 1-[2-(p-chlorophenoxy)-2-methylpropionate]-1,3-diacetate may also be prepared by following the procedure of Example 3 but using 3.75 g. (0.060 mole) of acetyl chloride in place of the palmitoyl chloride.

EXAMPLE 4

Glycerol, 2-[2-(p-chlorophenoxy)-2-methyl-propionate]-1,3-dibutyrate

A mixture of 50 g. of 2-p-chlorophenoxy-2-methylpropionic acid and 54.7 g. (33.42 ml.) of thionyl chloride was refluxed in 100 ml. of dry benzene for 1.5 hours. It was then concentrated to an oil. This oil was taken up in benzene and concentrated. This operation was repeated four times.

A mixture of 3.25 g. of the acid chloride, prepared as above, and 3.25 g. of dibutyrin was prepared in 100 ml. of pyridine and allowed to stand at room temperature for two days. The mixture was then evaporated to dryness, and the residue was dissolved in 50 ml. of methylene chloride. This solution was washed 3 times with one volume of saturated $NaHCO_3$ to remove excess acid. The solution was dried over solid $Na_2SO_4$ for one hour and was then filtered. The filtrate was evaporated to dryness. After further drying in a vacuum desiccator overnight, the residue was washed with water, concentrated to an oil, and then freed of water under vacuum.

*Analysis.*—Calcd. for $C_{21}H_{29}ClO_7$ (percent): C, 58.80; H, 6.81; Cl, 8.28. Found (percent): C, 58.50; H, 6.74; Cl, 8.54.

The invention that is claimed is:

1. A compound having the formula:

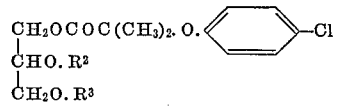

wherein $R^2$ is selected from the group consisting of hydrogen and a fatty acid residue having the formula $-CO(CH_2)_nCH_3$ where $n$ is a number from 2 to 14; and $R^3$ is selected from the group consisting of an aryloxyalkanol group having the formula

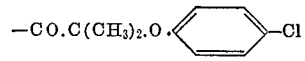

and said fatty acid residue, with the proviso that when $R^3$ is said aryloxyalkanoyl group, $R^2$ must be said fatty acid residue.

2. A compound having the formula:

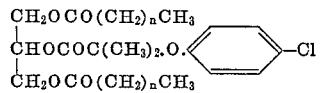

wherein $n$ is a number from 2 to 14.

3. A compound of claim 1; glycerol, 2-palmitate, 1,3-di[2-(p-chlorophenoxy)-2-methylpropionate].

4. A compound of claim 1; glycerol, 1-[2-(p-chlorophenoxy)-2-methylpropionate], 3-palmitate.

5. A compound of claim 2; glycerol, 2-[2-(p-chlorophenoxy)-2-methylpropionate], 1,3-dipalmitate.

6. A compound of claim 2; glycerol, 2-[2-(p-chlorophenoxy)-2-methylpropionate], 1,3-dibutyrate.

References Cited

UNITED STATES PATENTS 3,494,957   2/1970   Nakanishi et al. _____ 260—473

LEWIS GOTTS, Primary Examiner

D. G. RIVERS, Assistant Examiner

U.S. Cl. X.R.

260—410.7, 410.8, 473 G, 308